United States Patent
Nozaki (10) Patent No.: US 11,453,209 B2
(45) Date of Patent: Sep. 27, 2022

(54) HEAT-SHRINKING MULTILAYER FILM AND HEAT-SHRINKING LABEL

(71) Applicant: GUNZE LIMITED, Ayabe (JP)

(72) Inventor: Takanori Nozaki, Shiga (JP)

(73) Assignee: Gunze Limited, Kyoto (JP)

( * ) Notice: Subject to any disclaimer, the term of this patent is extended or adjusted under 35 U.S.C. 154(b) by 0 days.

(21) Appl. No.: 16/982,402

(22) PCT Filed: Jun. 26, 2019

(86) PCT No.: PCT/JP2019/025387
§ 371 (c)(1),
(2) Date: Sep. 18, 2020

(87) PCT Pub. No.: WO2020/021948
PCT Pub. Date: Jan. 30, 2020

(65) Prior Publication Data
US 2021/0053327 A1 Feb. 25, 2021

(30) Foreign Application Priority Data
Jul. 25, 2018 (JP) .............................. JP2018-139250

(51) Int. Cl.
*B32B 27/28* (2006.01)
*B32B 7/027* (2019.01)
(Continued)

(52) U.S. Cl.
CPC .............. *B32B 27/28* (2013.01); *B32B 7/027* (2019.01); *B32B 7/12* (2013.01); *B32B 27/08* (2013.01);
(Continued)

(58) Field of Classification Search
CPC ........... B32B 7/027; B32B 7/028; B32B 7/12; B32B 27/08; B32B 27/28; B32B 27/302;
(Continued)

(56) References Cited

U.S. PATENT DOCUMENTS

| 2008/0057236 | A1 | 3/2008 | Yamada et al. |
| 2009/0202851 | A1* | 8/2009 | Maruichi ................. B32B 27/36 428/483 |
| 2009/0280341 | A1* | 11/2009 | Maruichi ................. B32B 27/08 428/483 |
| 2010/0055361 | A1* | 3/2010 | Kawasaki ............. B29C 61/003 428/327 |

(Continued)

FOREIGN PATENT DOCUMENTS

| CN | 105229065 | 1/2016 |
| CN | 107405825 | 11/2017 |

(Continued)

OTHER PUBLICATIONS

Machine Translation of JP 2015-160429 via EPO (Year: 2015).*

*Primary Examiner* — Laura C Powers
*Assistant Examiner* — Rebecca L Grusby
(74) *Attorney, Agent, or Firm* — Hamre, Schumann, Mueller & Larson, P.C.

(57) ABSTRACT

The present invention provides a heat shrinkable multilayer film that can prevent layer misalignment at a center seal portion and thereby provide a labelled container having excellent appearance when the film is attached to a container as a heat shrinkable label for dry heat shrinking, and a heat shrinkable label including the heat shrinkable multilayer film as a base film. Provided is a heat shrinkable multilayer film including: front and back layers each containing a polyester resin; an interlayer containing a polystyrene resin; and adhesive layers, wherein the front and back layers and the interlayer are stacked with the adhesive layers interposed therebetween, and the heat shrinkable multilayer film has a maximum shrinkage stress of 3.5 to 11 MPa when immersed in hot water at 80° C. for 30 seconds.

4 Claims, 2 Drawing Sheets

(51) Int. Cl.
*B32B 7/12* (2006.01)
*B32B 27/08* (2006.01)
*B32B 27/36* (2006.01)
*G09F 3/02* (2006.01)
*G09F 3/00* (2006.01)
*G09F 3/04* (2006.01)
*B32B 27/30* (2006.01)

(52) U.S. Cl.
CPC ............ *B32B 27/302* (2013.01); *B32B 27/36* (2013.01); *G09F 3/02* (2013.01); *G09F 3/0291* (2013.01); *G09F 3/04* (2013.01); *B32B 2307/736* (2013.01); *B32B 2519/00* (2013.01); *G09F 2003/0257* (2013.01); *G09F 2003/0272* (2013.01)

(58) Field of Classification Search
CPC . B32B 27/36; B32B 2250/24; B32B 2270/00; B32B 2274/00; B32B 2307/736; B32B 2519/00; G09F 3/02; G09F 3/0291; G09F 3/04; G09F 2003/0257; G09F 2003/0272
See application file for complete search history.

(56) References Cited

U.S. PATENT DOCUMENTS

| | | | |
|---|---|---|---|
| 2014/0220369 A1* | 8/2014 | Ishikawa | B32B 27/308 |
| | | | 428/483 |
| 2016/0090456 A1 | 3/2016 | Ishimaru et al. | |
| 2017/0190158 A1* | 7/2017 | Ishikawa | G09F 3/04 |
| 2018/0043607 A1 | 2/2018 | Haruta et al. | |

FOREIGN PATENT DOCUMENTS

| | | | | |
|---|---|---|---|---|
| JP | 61-41543 | | 2/1986 | |
| JP | 2002-351332 | | 12/2002 | |
| JP | 2006-015745 | | 1/2006 | |
| JP | 2006-044179 | | 2/2006 | |
| JP | 2006-045317 | | 2/2006 | |
| JP | 2007-160544 | | 6/2007 | |
| JP | 2009-178887 | | 8/2009 | |
| JP | 2014-172214 | | 9/2014 | |
| JP | 2015-160429 | | 9/2015 | |
| JP | 2015160429 A | * | 9/2015 | .......... A47D 13/025 |
| WO | 2012/067388 | | 5/2012 | |

* cited by examiner

HEAT-SHRINKING MULTILAYER FILM AND HEAT-SHRINKING LABEL

TECHNICAL FIELD

The present invention relates to a heat shrinkable multilayer film that can prevent layer misalignment at a center seal portion and thereby provide a labelled container having excellent appearance when the film is attached to a container as a heat shrinkable label for dry heat shrinking, and a heat shrinkable label including the heat shrinkable multilayer film as a base film.

BACKGROUND ART

Many recent containers such as plastic bottles and metal cans have heat shrinkable labels that are produced by printing images and the like on a base film made of a heat shrinkable resin.

Wet heat shrinking and dry heat shrinking are two widely used methods for attaching a heat shrinkable label to a container by heating.

Wet heat shrinking is a method for attaching a heat shrinkable label to a container by shrinking the label by heating using water vapor. Water vapor, which has high thermal conductivity, can give sufficient heat to the heat shrinkable resin film in a short time, thus significantly increasing the label attaching rate. Additionally, wet heat shrinking is less likely to cause uneven heating in the atmosphere, allowing the attached label to have excellent shrink finish quality with less distortion of printed images and fewer wrinkles.

Dry heat shrinking is a method for attaching a heat shrinkable label to a container by shrinking the label by heating using hot air. Because of no use of water vapor, dry heat shrinking is more hygienic than wet heat shrinking. Dry heat shrinking also has an advantage that it requires simpler equipment for shrinking and attaching a label than wet heat shrinking. Dry heat shrinking is thus usually used to attach heat shrinkable labels to containers in small lots or attaching heat shrinkable labels to containers before being filled with the contents.

Heat shrinkable labels attached by dry heat shrinking are mainly those containing polystyrene resins, because polystyrene resins have excellent low-temperature shrinkability. However, polystyrene resin films, having low rigidity, have poor compatibility with machines, and thus are likely to cause trouble such as label clogging. Polystyrene resin films also have insufficient solvent resistance, and thus may shrink or dissolve due to adherence of oil when used to package oil-containing products.

Instead of polystyrene resin films, polyester films, which have excellent heat resistance and solvent resistance, have also been used as heat shrinkable labels. However, polyester films have poor low-temperature shrinkability and rapidly shrink, which is likely to cause distortion of printed images or wrinkles when the label is attached to a container.

Patent Literature 1 discloses a hard multilayer shrinkable film including an interlayer containing a polystyrene resin, outer surface layers containing a polyester resin, the outer surface layers being stacked on the interlayer with adhesive layers containing an olefin resin therebetween. Patent Literature 2 discloses a heat shrink label including a base film. The base film includes an interlayer containing a polystyrene resin and outer surface layers containing a polyester resin made of a specific monomer, the outer surface layers being stacked on both surfaces of the interlayer with no adhesive layer therebetween. Patent Literature 3 discloses a laminated film including surface layers containing a polyester resin, an interlayer containing a styrene resin, and adhesive layers containing an adhesive resin.

Figure 1:
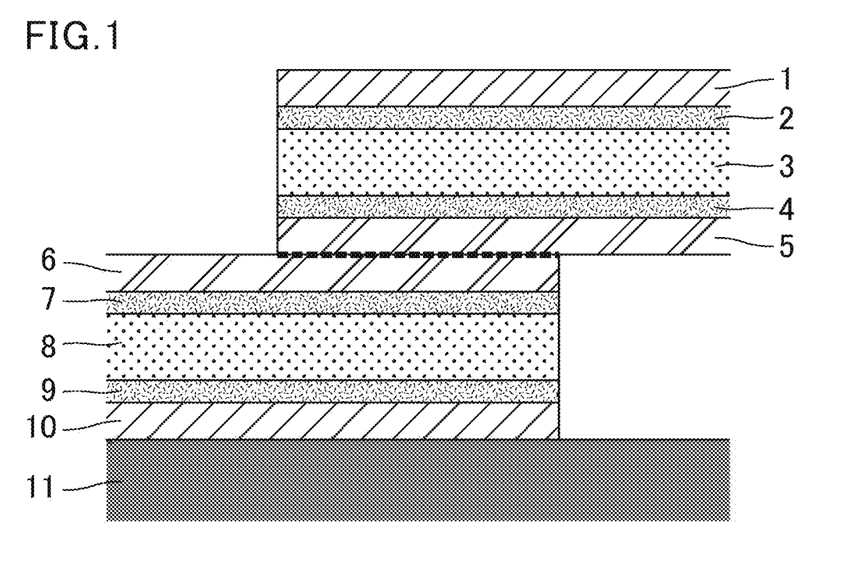
FIG. 1 is a schematic view of a center seal portion of a heat shrinkable label.
Figure 2:
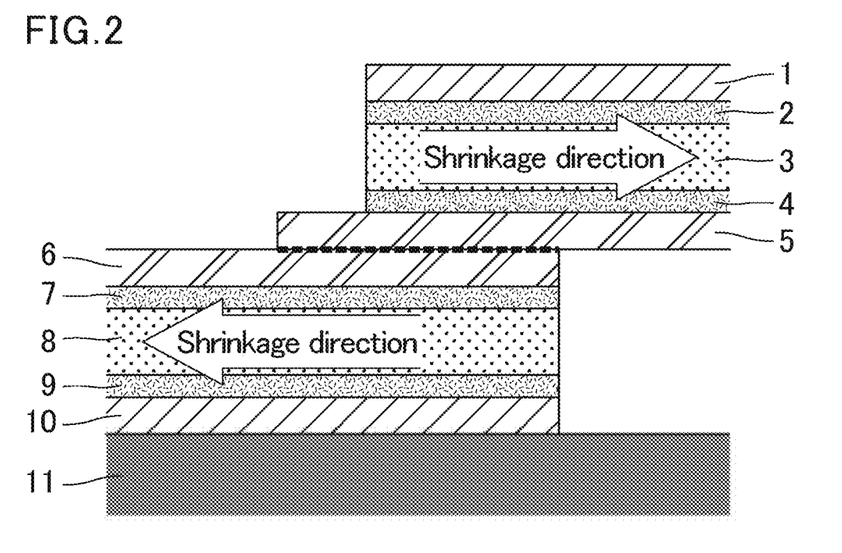
FIG. 2 is a schematic view of layer misalignment at a center seal portion of a heat shrinkable label.

In such heat shrinkable labels, as shown in FIG. 1, front or back layers 5 and 6 are welded to each other by solvent sealing. In attaching such a heat shrinkable label by dry heat shrinking, the center seal portion, where the overlapping film ends are welded by solvent sealing, may suffer layer misalignment as shown in FIG. 2 because a front or back layer 1, an adhesive layer 2, an interlayer 3, and an adhesive layer 4 on the outer side of the label shrink more than the front or back layer 5 on the container side at the center seal portion.

Containers for toiletry particularly have irregular shapes with high design quality for sales promotion or product differentiation. It is difficult to give desired shrink finish to these irregularly shaped containers, and thus such containers are exposed to hot air for a longer time than common cylindrical containers. Such longer exposure increases the layer misalignment between the interlayer and the front or back layer, causing appearance defects in such toiletry containers. Furthermore, increased layer misalignment may cause tearing of the film from the misaligned portion.

CITATION LIST

Patent Literature

Patent Literature 1: JP S61-41543 A
Patent Literature 2: JP 2002-351332 A
Patent Literature 3: JP 2006-15745 A

SUMMARY OF INVENTION

Technical Problem

In view of the current situation, the present invention aims to provide a heat shrinkable multilayer film that can prevent layer misalignment at a center seal portion and thereby provide a labelled container having excellent appearance when the film is attached to a container as a heat shrinkable label for dry heat shrinking, and a heat shrinkable label including the heat shrinkable multilayer film as a base film.

Solution to Problem

The present invention relates to a heat shrinkable multilayer film including: front and back layers each containing a polyester resin; an interlayer containing a polystyrene resin; and adhesive layers, wherein the front and back layers and the interlayer are stacked with the adhesive layers interposed therebetween, and the heat shrinkable multilayer film has a maximum shrinkage stress of 3.5 to 11 MPa when immersed in hot water at 80° C. for 30 seconds.

The present invention is described in detail below.

The present inventors made intensive studies to arrive at a heat shrinkable multilayer film in which front and back layers containing a polyester resin are stacked on an interlayer containing a polystyrene resin with adhesive layers interposed therebetween, and which has a maximum shrinkage stress within a predetermined range when immersed in hot water at 80° C. for a predetermined time. The inventors found out that the heat shrinkable multilayer film can reduce layer misalignment at the center seal portion of the label even in dry heat shrinking involving long-time exposure to hot air, and thus can provide a labelled container with excellent appearance. The inventors thus completed the present invention.

The "layer misalignment" refers to a phenomenon in which the front layer appears misaligned because of separation of the back layer from the interlayer at the center seal portion of the heat shrinkable label and shrinkage of the front layer, adhesive layer, and interlayer due to the heat of the tunnel in attaching the heat shrinkable label to a container.

The heat shrinkable multilayer film of the present invention has a structure in which front and back layers each containing a polyester resin and an interlayer containing a polystyrene resin are stacked with adhesive layers interposed therebetween.

The "front and back layers" as used herein mean both the front layer and the back layer.

(Front and Back Layers)

The front and back layers each contain a polyester resin.

Examples of the polyester resin include those obtainable by condensation polymerization of a dicarboxylic acid component and a diol component. Particularly preferred are aromatic polyester resins containing 55 mol % or more of terephthalic acid in 100 mol % of the dicarboxylic acid components. The aromatic polyester resins may contain, in addition to terephthalic acid, any of o-phthalic acid, isophthalic acid, succinic acid, adipic acid, sebacic acid, azelaic acid, octylsuccinic acid, cyclohexane dicarboxylic acid, naphthalene dicarboxylic acid, fumaric acid, maleic acid, itaconic acid, decamethylene carboxylic acid, anhydrides thereof, and lower alkyl esters thereof, as the dicarboxylic acid component.

The diol component is not limited. Examples thereof include aliphatic diols such as ethylene glycol, 1,3-propanediol, 1,4-butanediol, diethylene glycol, 1,5-pentanediol, 1,6-hexanediol, dipropylene glycol, triethylene glycol, tetraethylene glycol, 1,2-propanediol, 1,3-butanediol, 2,3-butanediol, 2,2-dimethylpropane-1,3-diol, 1,2-hexanediol, 2,5-hexanediol, 2-methyl-2,4-pentanediol, 3-methyl-1,3-pentanediol, 2-ethyl-1,3-hexanediol, and polytetramethylene ether glycol; and alicyclic diols such as 2,2-bis(4-hydroxycyclohexyl)propane, adducts of alkylene oxide with 2,2-bis(4-hydroxycyclohexyl)propane, 1,4-cyclohexanediol, and 1,4-cyclohexane dimethanol.

Preferred among the polyester resins are those containing a component derived from terephthalic acid as a dicarboxylic acid component and a component derived from ethylene glycol and/or 1,4-cyclohexane dimethanol as a diol component. By using such an aromatic polyester copolymer resin, excellent shrinkability can be provided to the heat shrinkable multilayer film.

For higher shrinkability, in 100 mol % of the diol components, the amount of a component derived from ethylene glycol is preferably 60 to 80 mol % and the amount of a component derived from 1,4-cyclohexane dimethanol is preferably 10 to 40 mol %.

Such an aromatic polyester copolymer resin may optionally further contain a component derived from diethylene glycol in an amount of 0 to 30 mol %, preferably 1 to 25 mol %, more preferably 2 to 20 mol %. Use of diethylene glycol increases tensile elongation at break in the main shrinkage direction of the heat shrinkable multilayer film, which prevents the front or back layer on the inner side from remaining alone on the container due to delamination in removing the label from the container. When the amount of the component derived from diethylene glycol is more than 30 mol %, the heat shrinkable multilayer film has too high low-temperature shrinkability and easily wrinkles when attached to a container.

The polyester resin containing a component derived from terephthalic acid as a dicarboxylic acid component may contain a component derived from 1,4-butanediol as a diol component. Such a polyester resin is generally referred to as polybutylene terephthalate resin.

The polybutylene terephthalate resin is preferably used in combination with the above aromatic polyester random copolymer resin containing a component derived from terephthalic acid as a dicarboxylic acid component and a component derived from ethylene glycol and 1,4-cyclohexane dimethanol as a diol component. Use of such a mixed resin provides excellent finish quality.

The polybutylene terephthalate resin may be a polybutylene terephthalate resin consisting only of a component derived from terephthalic acid and a component derived from 1,4-butanediol, or may be a polybutylene terephthalate resin containing a dicarboxylic acid component other than a component derived from terephthalic acid and/or a diol component other than a component derived from 1,4-butanediol.

The amount of the dicarboxylic acid component other than a component derived from terephthalic acid is preferably 10 mol % or less in 100 mol % of the dicarboxylic acid components. When the amount is 10 mol % or less, the polybutylene terephthalate resin can exhibit improved heat resistance. The amount of the diol component other than a component derived from 1,4-butanediol is preferably 10 mol % or less in 100 mol % of the diol components. When the amount is 10 mol % or less, the polybutylene terephthalate resin can exhibit further improved heat resistance.

The amount of the polybutylene terephthalate resin added is not limited, but is preferably 30% by weight or less. Adding the polybutylene terephthalate resin in an amount of 30% by weight or less can reduce natural shrinkage, and also can sufficiently improve film rigidity.

The lower limit of the glass transition temperature of the polyester resin constituting the front and back layers is preferably 55° C. and the upper limit thereof is preferably 95° C. The polyester resin having a glass transition temperature of 55° C. or higher can sufficiently increase the shrinkage starting temperature of the heat shrinkable multilayer film, and also can reduce natural shrinkage and blocking. The polyester resin having a glass transition temperature of 95° C. or lower can sufficiently improve the low-temperature shrinkability and shrink finish quality of the heat shrinkable multilayer film, and can reduce a time-related decrease in low-temperature shrinkability and reduce resin whitening during stretching. The lower limit of the glass transition temperature is more preferably 60° C., still more preferably 65° C. and the upper limit thereof is more preferably 90° C., still more preferably 85° C.

The glass transition temperature of the polyester resin can be measured with a differential scanning calorimeter (DSC) by a method in conformity with ISO 3146:2000.

The lower limit of the tensile modulus of the polyester resin constituting the front and back layers is preferably 1000 MPa and the upper limit thereof is preferably 4000 MPa. The polyester resin having a tensile modulus of 1000 MPa or more can sufficiently increase the shrinkage starting temperature of the heat shrinkable film, and also can reduce natural shrinkage. The polyester resin having a tensile modulus of 4000 MPa or less can improve the low-temperature shrinkability and shrink finish quality of the heat shrinkable multilayer film, and can reduce a time-related decrease in low-temperature shrinkability. The lower limit of the tensile modulus is more preferably 1500 MPa and the upper limit thereof is more preferably 3700 MPa.

The tensile modulus can be measured by a method in conformity with ASTM-D882 (Test A).

The resin constituting the front and back layers preferably has a storage modulus at 70° C. of $1.0 \times 10^7$ to $1.0 \times 10^9$ Pa.

The resin having a storage modulus at 70° C. within the above comparatively low range allows the front and back layers to start shrinking (softening) from a comparatively low temperature around 70° C. In other words, the resin can increase the low-temperature shrinkability of the front and back layers. This increases the low-temperature shrinkability of the heat shrinkable multilayer film as a whole while moderating the difference in shrinkage behavior (softening behavior) between the front and back layers and the interlayer, leading to excellent shrink finish quality. Such excellent low-temperature shrinkability is less likely to decrease with time. The storage modulus can be measured using a viscoelastometer such as Rheogel E-4000 (produced by UBM) in a tensile mode under the following conditions: vibration frequency: 10 Hz, strain: 0.1%, temperature increase rate: 3° C./min, and measurement temperature: from −120° C. to 150° C.

With a storage modulus at 70° C. of less than $1.0 \times 10^7$ Pa, the resin may cause the heat shrinkable multilayer film to have too low a shrinkage starting temperature, or increase the natural shrinkage ratio. The natural shrinkage means slight shrinkage of the heat shrinkable multilayer film during storage at room temperature (20° C. to 23° C.). A heat shrinkable multilayer film having a high natural shrinkage ratio may have a diameter smaller than the container diameter, and possibly cannot be attached to a container. The lower limit of the storage modulus at 70° C. is more preferably $2.5 \times 10^7$ Pa, still more preferably $5.0 \times 10^7$ Pa.

With a storage modulus at 70° C. of $1.0 \times 10^9$ Pa or more, the resin may reduce the low-temperature shrinkability and shrink finish quality of the heat shrinkable multilayer film, or increase the time-related decrease in the low-temperature shrinkability. The upper limit of the storage modulus at 70° C. is more preferably $9.0 \times 10^8$ Pa, still more preferably $8.0 \times 10^6$ Pa.

The front and back layers may have any storage modulus at temperatures other than 70° C. At 75° C., the storage modulus is preferably $1.0 \times 10^6$ to $5.0 \times 100$ Pa, more preferably $5.0 \times 10^6$ to $2.5 \times 10^8$ Pa. At 80° C., the storage modulus is preferably $1.0 \times 10^6$ to $1.0 \times 10^8$ Pa, more preferably $2.5 \times 10^6$ to $7.5 \times 10^7$ Pa. At 90° C., the storage modulus is preferably $1.0 \times 10^6$ to $2.5 \times 10^7$ Pa, more preferably $2.0 \times 10^6$ to $1.0 \times 10^7$ Pa. At 100° C., the storage modulus is preferably $8.0 \times 10^5$ to $1.0 \times 10^7$ Pa, more preferably $1.0 \times 10^6$ to $8.0 \times 10^6$ Pa.

Examples of commercially available polyester resins for use in the front and back layers include "Easter", "Embrace LV" (both produced by Eastman Chemical Company), "BELLPET" (produced by Bell Polyester Products, Inc.), and "NOVADURAN" (produced by Mitsubishi Engineering-Plastics Corporation).

The front and back layers may contain one polyester resin having the above-described composition alone, or may contain two or more polyester resins having the above composition. The front and back layers may contain polyester resins having different compositions, but preferably contain polyester resins having the same composition to prevent trouble such as curling of the film.

The front and back layers may optionally contain additives such as antioxidants, heat stabilizers, ultraviolet absorbers, light stabilizers, lubricants, antistatic agents, antiblocking agents, flame retardants, antimicrobials, fluorescent whitening agents, and colorants.

(Interlayer)

The heat shrinkable multilayer film of the present invention includes the interlayer.

The interlayer contains a polystyrene resin.

Examples of the polystyrene resin include aromatic vinyl hydrocarbon-conjugated diene copolymers, mixed resins of an aromatic vinyl hydrocarbon-conjugated diene copolymer and an aromatic vinyl hydrocarbon-unsaturated aliphatic carboxylate copolymer, and rubber-modified high impact polystyrenes. The polystyrene resin allows the heat shrinkable multilayer film of the present invention to start shrinking at low temperature and to have high shrinkability.

The "aromatic vinyl hydrocarbon-conjugated diene copolymer" as used herein means a copolymer containing a component derived from an aromatic vinyl hydrocarbon and a component derived from a conjugated diene.

The aromatic vinyl hydrocarbon is not limited. Examples thereof include styrene, o-methylstyrene, and p-methylstyrene. These may be used alone or in combination of two or more thereof. The conjugated diene is not limited. Examples thereof include 1,3-butadiene, 2-methyl-1,3-butadiene, 2,3-dimethyl-1,3-butadiene, 1,3-pentadiene, and 1,3-hexadiene. These may be used alone or in combination of two or more thereof.

The aromatic vinyl hydrocarbon-conjugated diene copolymer preferably contains a styrene-butadiene copolymer (SBS resin) for particularly excellent heat shrinkability. To produce a heat shrinkable multilayer film with less fish eyes, the aromatic vinyl hydrocarbon-conjugated diene copolymer preferably contains an aromatic vinyl hydrocarbon-conjugated diene copolymer containing 2-methyl-1,3-butadiene (isoprene) as the conjugated diene, such as a styrene-isoprene copolymer (SIS resin) or a styrene-isoprene-butadiene copolymer (SIBS).

The aromatic vinyl hydrocarbon-conjugated diene copolymer may contain any one of the SBS resin, SIS resin, and SIBS resin alone, or may contain more than one of them in combination. In the case of using more than one of the SBS resin, SIS resin, and SIBS resin, the resins may be dry-blended with each other, or the resins may be kneadpelletized at a specific composition through an extruder and the obtained compound resin may be used.

An aromatic vinyl hydrocarbon-conjugated diene copolymer containing one or more of the SBS resin, SIS resin, and SIBS resin preferably has a styrene content of 65 to 90% by weight and a conjugated diene content of 10 to 35% by weight in 100% by weight of the aromatic vinyl hydrocarbon-conjugated diene copolymer so as to provide a heat shrinkable multilayer film having particularly excellent heat shrinkability. A styrene content of more than 90% by weight or a conjugated diene content of less than 10% by weight may cause the heat shrinkable multilayer film to be easily torn under tension or to unexpectedly break during processing such as printing. A styrene content of less than 65% by weight or a conjugated diene content of more than 35% by weight may cause formation of impurities such as gel during molding or may cause the heat shrinkable multilayer film to have poor strength, likely resulting in poor handleability.

The "aromatic vinyl hydrocarbon-unsaturated aliphatic carboxylate copolymer" herein means a copolymer containing a component derived from an aromatic vinyl hydrocarbon and a component derived from an unsaturated aliphatic carboxylate.

The aromatic vinyl hydrocarbon is not limited, and may be the same aromatic vinyl hydrocarbon as that used for the aromatic vinyl hydrocarbon-conjugated diene copolymer. The unsaturated aliphatic carboxylate is not limited. Examples thereof include methyl (meth)acrylate, butyl (meth)acrylate, 2-ethylhexyl (meth)acrylate, lauryl (meth) acrylate, and stearyl (meth)acrylate. The "(meth)acrylate" includes both acrylate and methacrylate.

When the aromatic vinyl hydrocarbon-unsaturated aliphatic carboxylate copolymer is a styrene-butyl acrylate copolymer, the styrene-butyl acrylate copolymer preferably has a styrene content of 60 to 90% by weight and a butyl acrylate content of 10 to 40% by weight in 100% by weight of the styrene-butyl acrylate copolymer. An aromatic vinyl hydrocarbon-unsaturated aliphatic carboxylate copolymer with such a composition allows the heat shrinkable multilayer film to have excellent heat shrinkability.

There is no limitation on the mixed resin of the aromatic vinyl hydrocarbon-conjugated diene copolymer and the aromatic vinyl hydrocarbon-unsaturated aliphatic carboxylate copolymer. The mixed resin preferably contains the aromatic vinyl hydrocarbon-unsaturated aliphatic carboxylate copolymer in an amount of 80% by weight or less.

The rubber-modified high impact polystyrene mainly contains a continuous phase of a styrene-alkyl methacrylate-alkyl acrylate terpolymer and a dispersed phase of a conjugated-diene-based rubber component.

Examples of the alkyl methacrylate forming the continuous phase include methyl methacrylate and ethyl methacrylate. Examples of the alkyl acrylate include methyl acrylate, ethyl acrylate, propyl acrylate, and butyl acrylate.

The proportion of the styrene in the terpolymer forming the continuous phase is preferably 20 to 80% by weight, more preferably 30 to 70% by weight. The proportion of the alkyl methacrylate is preferably 10 to 50% by weight, more preferably 15 to 40% by weight. The proportion of the alkyl acrylate is preferably 1 to 30% by weight, more preferably 5 to 20% by weight.

The conjugated-diene-based rubber component forming the dispersed phase is preferably a polybutadiene or a styrene-butadiene copolymer having a styrene content of 5 to 30% by weight.

The conjugated-diene-based rubber component forming the dispersed phase preferably has a particle size of 0.1 to 1.2 μm, more preferably 0.3 to 0.8 μm. A conjugated-diene-based rubber component having a particle size of smaller than 0.1 μm may lead to insufficient impact resistance of the rubber-modified high impact polystyrene. A conjugated-diene-based rubber component having a particle size of greater than 1.2 μm may reduce the transparency of the interlayer.

In the rubber-modified high impact polystyrene, the proportion of the continuous phase composed of the styrene-alkyl methacrylate-alkyl acrylate terpolymer is preferably 70 to 95% by weight, and the proportion of the dispersed phase composed of the conjugated-diene-based rubber component is preferably 5 to 20% by weight. A dispersed phase in a proportion of less than 5% by weight may lead to insufficient impact resistance of the rubber-modified high impact polystyrene. A dispersed phase in a proportion of more than 20% by weight may reduce the transparency of the interlayer.

The lower limit of the Vicat softening temperature of the polystyrene resin is preferably 60° C. and the upper limit thereof is preferably 85° C. The polystyrene resin having a Vicat softening temperature of 60° C. or higher allows the heat shrinkable multilayer film to have good low-temperature shrinkability, thus preventing wrinkles when the film is attached to a container. The polystyrene resin having a Vicat softening temperature of 85° C. or lower can sufficiently increase the low-temperature shrinkability of the heat shrinkable multilayer film, thus preventing the film from remaining partly unshrunk when the film is attached to a container. The lower limit of the Vicat softening temperature is more preferably 65° C. and the upper limit thereof is more preferably 80° C.

The Vicat softening temperature can be measured by a method in conformity with ISO 306.

The lower limit of the melt flow rate (MFR) at 200° C. of the polystyrene resin is preferably 2 g/10 min and the upper limit thereof is preferably 15 g/10 min. A MFR at 200° C. of lower than 2 g/10 min may make the film formation difficult. A MFR at 200° C. of higher than 15 g/10 min may lead to low mechanical strength of the film, making the film unsuitable for practical use. The lower limit of the MFR at 200° C. is more preferably 4 g/10 min and the upper limit thereof is more preferably 12 g/10 min. The MFR may be determined by a method in conformity with ISO1133.

Examples of commercially available polystyrene resins for use in the interlayer include "CLEAREN" (produced by Denki Kagaku Kogyo Kabushiki Kaisha), "Asaflex" (produced by Asahi Kasei Chemicals Corporation), "Styrolux" (produced by BASF SE), and "PSJ-polystyrene" (produced by PS Japan Corporation).

The interlayer preferably contains a polystyrene resin (A) having a Vicat softening temperature of 80° C. or higher in an amount of 1 to 60% by weight.

The interlayer containing the polystyrene resin (A) in a predetermined amount can further improve the layer misalignment reducing effect at the center seal portion of the label during dry heat shrinking.

The lower limit of the amount of the polystyrene resin (A) in the interlayer is more preferably 5% by weight, still more preferably 10% by weight. The upper limit thereof is more preferably 50% by weight, still more preferably 35% by weight.

The interlayer preferably contains a polystyrene resin (B) having a Vicat softening temperature of lower than 80° C. in an amount of 40 to 99% by weight.

The interlayer containing the polystyrene resin (B) in a predetermined amount can further improve the layer misalignment reducing effect at the center seal portion of the label during dry heat shrinking.

The lower limit of the amount of the polystyrene resin (B) in the interlayer is more preferably 50% by weight, still more preferably 65% by weight. The upper limit thereof is more preferably 95% by weight, still more preferably 90% by weight.

In the interlayer, the lower limit of the ratio of the amount of the polystyrene resin (A) to the amount of the polystyrene resin (B) (the amount of the polystyrene resin (A)/the amount of the polystyrene resin (B)) is preferably 1/99, more preferably 10/90 and the upper limit thereof is preferably 60/40, more preferably 50/50.

The lower limit of the styrene component content of the interlayer is preferably 60% by weight, more preferably 70% by weight and the upper limit thereof is preferably 90% by weight, more preferably 80% by weight.

The styrene component content of the interlayer can be calculated from the amount of the polystyrene resin constituting the interlayer and the proportion of a styrene component in the polystyrene resin.

The difference in Vicat softening temperature between the polystyrene resin (A) and the polystyrene resin (B) is preferably 5° C. or more, more preferably 10° C. or more, and preferably 30° C. or less, more preferably 20° C. or less.

The interlayer may optionally contain additives such as antioxidants, heat stabilizers, ultraviolet absorbers, light stabilizers, lubricants, antistatic agents, anti-blocking agents, fire retardants, antimicrobials, fluorescent whitening agents, and colorants.

(Adhesive Layer)

In the heat shrinkable multilayer film of the present invention, the front and back layers and the interlayer are stacked with adhesive layers interposed therebetween.

The resin constituting the adhesive layers is preferably a mixed resin containing a polystyrene resin and a polyester elastomer. Such adhesive layers have high compatibility with both of the polyester resin constituting the front and back layers and the polystyrene resin constituting the interlayer, and thus can bond these layers with high adhesive strength. The resin constituting the adhesive layers is dissolved or swollen in the solvent that dissolves the polyester resin constituting the front and back layers. The solvent thus can penetrate to the inside of the heat shrinkable multilayer film in label production, preventing delamination in the subsequent heat shrinking.

The polystyrene resin used in the adhesive layers preferably contains an aromatic vinyl hydrocarbon-conjugated diene copolymer for particularly excellent adhesiveness. The polystyrene resin particularly preferably contains a styrene-butadiene copolymer (SBS resin). To achieve excellent adhesiveness, the styrene-butadiene copolymer, if used, preferably has a higher butadiene content than the styrene-butadiene copolymer used in the interlayer. To produce a heat shrinkable multilayer film having better adhesiveness, the polystyrene resin preferably contains an aromatic vinyl hydrocarbon-conjugated diene copolymer containing 2-methyl-1,3-butadiene (isoprene) as the conjugated diene, such as a styrene-isoprene copolymer (SIS resin) or a styrene-isoprene-butadiene copolymer (SIBS). The polystyrene resin may further contain a hydrogenated styrene resin obtained by hydrogenating an aromatic vinyl hydrocarbon-conjugated diene copolymer, such as a styrene-butadiene-butylene copolymer (SBBS resin) or a styrene-ethylene-butylene copolymer (SEBS resin), to the extent that the hydrogenated styrene resin is not a main component of the polystyrene resin. A polystyrene resin containing a hydrogenated styrene resin as a main component tends to reduce transparency.

The polystyrene resin may contain one of the SBS resin, SIS resin, and SIBS resin alone, or two or more of them in combination. When two or more of the SBS resin, SIS resin, SIBS resin, SBBS resin, and SEBS resin are used in combination, the resins may be dry-blended with each other, or the resins may be knead-pelletized at a specific composition through an extruder and the obtained compound resin may be used.

When the polystyrene resin is an aromatic vinyl hydrocarbon-conjugated diene copolymer and contains one or more of the SBS resin, SIS resin, and SIBS resin, the aromatic vinyl hydrocarbon-conjugated diene copolymer preferably has a styrene content of 50 to 90% by weight and a conjugated diene content of 10 to 50% by weight in 100% by weight of the aromatic vinyl hydrocarbon-conjugated diene copolymer so as to provide a heat shrinkable multilayer film having particularly excellent adhesive strength between layers. A styrene content of less than 50% by weight or a conjugated diene content of more than 50% by weight tends to cause formation of impurities such as gel during molding. A styrene content of more than 90% by weight or a conjugated diene content of less than 10% by weight tends to lead to low adhesive strength between layers.

The styrene content of the aromatic vinyl hydrocarbon-conjugated diene copolymer is more preferably 60 to 80% by weight, still more preferably 70 to 75% by weight. The conjugated diene content of the aromatic vinyl hydrocarbon-conjugated diene copolymer is more preferably 20 to 40% by weight, still more preferably 25 to 30% by weight.

When the polystyrene resin contains the hydrogenated styrene resin, the hydrogenated styrene resin preferably has a styrene content of 20 to 80% by weight and a butadiene-butylene or ethylene-butylene content of 20 to 80% by weight so as to provide a heat shrinkable multilayer film having particularly excellent adhesive strength between layers. A hydrogenated polystyrene resin having a styrene content of less than 20% by weight tends to reduce the adhesive strength between layers. A hydrogenated polystyrene resin having a styrene content of more than 80% by weight may reduce heat resistance.

The lower limit of the Vicat softening temperature of the polystyrene resin used in the adhesive layers is preferably 50° C. and the upper limit thereof is preferably 85° C. The polystyrene resin having a Vicat softening temperature of 50° C. or higher allows the heat shrinkable multilayer film to sufficiently reduce delamination due to heating when the film is attached to a container. The polystyrene resin having a Vicat softening temperature of 85° C. or lower can sufficiently improve the adhesive strength of the heat shrinkable multilayer film. The lower limit of the Vicat softening temperature is more preferably 55° C., still more preferably 60° C., particularly preferably 65° C. and the upper limit thereof is more preferably 80° C.

The Vicat softening temperature can be measured by a method in conformity with ISO 306.

The lower limit of the melt flow rate (MFR) at 200° C. of the polystyrene resin used in the adhesive layers is preferably 2 g/10 min and the upper limit thereof is preferably 15 g/10 min. A polystyrene resin having a MFR at 200° C. of lower than 2 g/10 min may stagnate in an extruder during a continuous production process, and tends to form impurities such as gel. A polystyrene resin having a MFR at 200° C. of higher than 15 g/10 min may fail to receive sufficient pressure during the film forming step, and thus tends to cause great thickness variation. The lower limit of the MFR at 200° C. is more preferably 4 g/10 min and the upper limit thereof is more preferably 12 g/10 min. The MFR can be measured by a method in conformity with ISO 1133.

The polyester elastomer used in the adhesive layers is composed of a polyester as a hard segment and a polyether or polyester as a soft segment having high rubber elasticity. Specific examples of the polyester elastomer include a block copolymer containing an aromatic polyester as a hard segment and an aliphatic polyether as a soft segment and a block copolymer containing an aromatic polyester as a hard segment and an aliphatic polyester as a soft segment.

The polyester elastomer is preferably a saturated polyester elastomer, particularly preferably a saturated polyester elastomer containing a polyalkylene ether glycol segment as a soft segment. The saturated polyester elastomer containing a polyalkylene ether glycol segment is preferably, for example, a block copolymer containing an aromatic polyester as a hard segment and a polyalkylene ether glycol as a soft segment.

When the polyester elastomer is a block copolymer containing an aromatic polyester and a polyalkylene ether glycol, the lower limit of the amount of the polyalkylene ether glycol segment is preferably 5% by weight and the upper limit thereof is preferably 90% by weight. When the amount is less than 5% by weight, the adhesive layers have low adhesiveness to the interlayer. When the amount is more than 90% by weight, the adhesive layers have low adhesiveness to the front and back layers. The lower limit of the amount of the polyalkylene ether glycol segment is more preferably 30% by weight and the upper limit thereof is more preferably 80% by weight. The lower limit is still more preferably 55% by weight.

Examples of the polyalkylene ether glycol include polyethylene glycol, poly(propylene ether)glycol, poly(tetramethylene ether)glycol, and poly(hexamethylene ether)glycol.

The lower limit of the number average molecular weight of the polyalkylene ether glycol is preferably 400 and the upper limit thereof is preferably 6000. The lower limit is more preferably 600 and the upper limit is more preferably 4000. The lower limit is still more preferably 1000 and the upper limit is still more preferably 3000. Use of a polyalkylene ether glycol with a number average molecular weight within the above range is preferred because it can provide favorable interlaminar strength. The number average molecular weight herein is determined by gel permeation chromatography (GPC).

The polyester elastomer may be produced by any method. For example, it may be produced by preparing an oligomer by esterification reaction or transesterification reaction using the following raw materials: (i) a C2-C12 aliphatic and/or alicyclic diol, (ii) an aromatic dicarboxylic acid and/or an alicyclic dicarboxylic acid, or an ester thereof, and (iii) a polyalkylene ether glycol with a number average molecular weight of 400 to 6000, and then performing condensation polymerization of the resulting oligomer.

Examples of the C2-C12 aliphatic and/or alicyclic diol include those typically used as a raw material of a polyester, especially as a raw material of a polyester thermoplastic elastomer. Specific examples thereof include ethylene glycol, propylene glycol, trimethylene glycol, 1,4-butanediol, 1,4-cyclohexanediol, and 1,4-cyclohexane dimethanol. Preferred among these are ethylene glycol and 1,4-butanediol, with 1,4-butanediol being more preferred. These may be used alone or in combination of two or more thereof.

Examples of the aromatic dicarboxylic acid and/or the alicyclic dicarboxylic acid include those typically used as a raw material of a polyester, especially as a raw material of a polyester thermoplastic elastomer. Specific examples thereof include terephthalic acid, isophthalic acid, phthalic acid, 2,6-naphthalene dicarboxylic acid, and cyclohexane dicarboxylic acid. Preferred among these are terephthalic acid and 2,6-naphthalene dicarboxylic acid, with terephthalic acid being more preferred. These may be used alone or in combination of two or more thereof.

Examples of commercially available polyester elastomers include those under the product names of "PRIMALLOY" (produced by Mitsubishi Chemical Corporation), "PELPRENE" (produced by Toyobo Co., Ltd.), and "Hytrel" (produced by Du Pont-Toray Co., Ltd.).

The polyester elastomer preferably has a melting point of 120° C. to 200° C. A polyester elastomer having a melting point of lower than 120° C. may reduce heat resistance, and thus separation of the film easily occurs from the center seal portion when the film is attached to a container as a heat shrinkable label. A polyester elastomer having a melting point of higher than 200° C. may fail to provide sufficient adhesive strength. The lower limit of the melting point is more preferably 130° C. and the upper limit thereof is more preferably 190° C.

The melting point can be measured using a differential scanning calorimeter (DSC-60, produced by Shimadzu Corporation).

The melting point of the polyester elastomer is affected by the copolymerization ratio between the polyester as a hard segment and the polyether or polyester as a soft segment and the structure of these segments. The melting point of the polyester elastomer usually tends to depend on the copolymerization amount of the polyether or polyester as a soft segment. A larger copolymerization amount of the polyether or polyester leads to a lower melting point, whereas a smaller copolymerization amount thereof leads to a higher melting point.

The melting point of the polyester as a hard segment constituting the polyester elastomer may be adjusted by changing the copolymerization components of the polyester, and thereby the melting point of the entire polyester elastomer may be adjusted.

Decreasing the molecular weight of the polyether or polyester as a soft segment decreases the block properties of the resulting polyester elastomer, and thus tends to decrease the melting point.

The lower limit of the durometer hardness of the polyester elastomer is preferably 10 and the upper limit thereof is preferably 80. The polyester elastomer having a durometer hardness of 10 or more improves the mechanical strength of the adhesive layers. The polyester elastomer having a durometer hardness of 80 or less can improve the flexibility and impact resistance of the adhesive layers. The lower limit of the durometer hardness is more preferably 15 and the upper limit thereof is more preferably 70. The lower limit is still more preferably 20 and the upper limit is still more preferably 60.

The durometer hardness can be determined by a method in conformity with ISO 18517 using a durometer (Type D).

The lower limit of the specific gravity of the polyester elastomer is preferably 0.95 and the upper limit thereof is preferably 1.20. The polyester elastomer having a specific gravity of 0.95 or more can provide heat resistance to the film, reducing separation of the film from the center seal portion when the film is attached to a container as a heat shrinkable label. The polyester elastomer having a specific gravity of 1.20 or less can increase the adhesive strength between the front and back layers and the interlayer.

The lower limit of the specific gravity is more preferably 0.98 and the upper limit thereof is more preferably 1.18.

The specific gravity can be determined by a method in conformity with ASTM D 792 by a water displacement method.

The lower limit of the tensile modulus of the polyester elastomer constituting the adhesive layers is preferably 1 MPa and the upper limit thereof is preferably 1000 MPa. A polyester elastomer having a tensile modulus of less than 1 MPa tends to reduce the mechanical strength of the adhesive layers. A polyester elastomer having a tensile modulus of more than 1000 MPa tends to reduce the adhesive strength between the front and back layers and the interlayer. The lower limit of the tensile modulus is more preferably 5 MPa and the upper limit thereof is more preferably 900 MPa. The tensile modulus can be measured in accordance with ASTM-882 (Test A).

The lower limit of the glass transition temperature of the polyester elastomer constituting the adhesive layers is preferably −70° C. and the upper limit thereof is preferably 0° C. A polyester elastomer having a glass transition temperature of lower than −70° C. may cause resin blocking that tends to deteriorate handleability. A polyester elastomer having a glass transition temperature of higher than 0° C. tends reduce the adhesive strength between the front and back layers and the interlayer. The lower limit of the glass transition temperature is more preferably −60° C. and the upper limit thereof is more preferably −5° C. The glass transition temperature of the polyester elastomer can be measured using a differential scanning calorimeter.

The polyester elastomer may be a modified product. Examples of the modified product include a modified polyester elastomer obtained by grafting an α,β-ethylenically unsaturated carboxylic acid to the polyester elastomer.

Examples of the α,β-ethylenically unsaturated carboxylic acid include: unsaturated carboxylic acids such as acrylic acid, maleic acid, fumaric acid, tetrahydrofumaric acid, itaconic acid, citraconic acid, crotonic acid, and isocrotonic acid; and unsaturated carboxylic anhydrides such as 2-octen-1-yl succinic anhydride, 2-dodecen-1-yl succinic anhydride, 2-octadecen-1-yl succinic anhydride, maleic anhydride, 2,3-dimethylmaleic anhydride, bromomaleic anhydride, dichloromaleic anhydride, citraconic anhydride, itaconic anhydride, 1-butene-3,4-dicarboxylic anhydride, 1-cyclopentene-1,2-dicarboxylic anhydride, 1,2,3,6-tetrahydrophthalic anhydride, 3,4,5,6-tetrahydrophthalic anhydride, exo-3,6-epoxy-1,2,3,6-tetrahydrophthalic anhydride, 5-norbornene-2,3-dicarboxylic anhydride, methyl-5-norbornene-2,3-dicarboxylic anhydride, endo-bicyclo[2.2.2]oct-5-ene-2,3-dicarboxylic anhydride, and bicyclo[2.2.2]oct-7-ene-2,3,5,6-tetracarboxylic anhydride. Preferred among these are acid anhydrides because they have high reactivity.

In each adhesive layer, the lower limit of the amount of the polystyrene resin is preferably 10% by weight and the upper limit thereof is preferably 95% by weight.

The adhesive layers containing the polystyrene resin in an amount of 10% by weight or more can reduce formation of a white crease at a fold when the film is strongly folded to produce a heat shrinkable label. Such adhesive layers also can sufficiently reduce layer misalignment at the center seal portion, preventing appearance defects. The adhesive layers containing the polystyrene resin in an amount of 95% by weight or less can provide sufficient interlaminar strength at low temperature and thereby reduce delamination. The lower limit of the amount of the polystyrene resin is more preferably 30% by weight, still more preferably 35% by weight and the upper limit thereof is more preferably 80% by weight, still more preferably 70% by weight.

In each adhesive layer, the lower limit of the amount of the polyester elastomer is preferably 5% by weight and the upper limit thereof is preferably 90% by weight.

The adhesive layers containing the polyester elastomer in an amount of 5% by weight or more can sufficiently improve interlaminar strength at low temperature and thereby can reduce delamination. The adhesive layers containing the polyester elastomer in an amount of 90% by weight or less can reduce formation of a white crease at a fold when the film is strongly folded to produce a heat shrinkable label, and also can sufficiently reduce layer misalignment at the center seal portion, preventing appearance defects. The lower limit of the amount of the polyester elastomer is more preferably 20% by weight, still more preferably 30% by weight and the upper limit thereof is more preferably 70% by weight, still more preferably 65% by weight.

The adhesive layers preferably contain, as the polystyrene resin, a styrene-butadiene copolymer (SBS resin) or a polystyrene resin containing 2-methyl-1,3-butadiene (isoprene) such as a styrene-isoprene copolymer (SIS resin) or a styrene-isoprene-butadiene copolymer (SIBS). The adhesive layers preferably contain, as the polyester elastomer, a block copolymer containing a polyester as a hard segment and a polyalkylene ether glycol as a soft segment or a modified product thereof.

The adhesive layers may optionally contain additives such as antioxidants, heat stabilizers, ultraviolet absorbers, light stabilizers, lubricants, antistatic agents, anti-blocking agents, flame retardants, antimicrobials, fluorescent whitening agents, and colorants.

The lower limit of the maximum shrinkage stress of the heat shrinkable multilayer film of the present invention when the film is immersed in hot water at 80° C. for 30 seconds is 3.5 MPa, and the upper limit thereof is 11 MPa. The heat shrinkable multilayer film having a maximum shrinkage stress of 3.5 MPa or more can sufficiently improve shrink finish quality when attached to a container. The heat shrinkable multilayer film having a maximum shrinkage stress of 11 MPa or less can reduce layer misalignment at the center seal portion of the label, and also can reduce deformation of the container when attached thereto. The lower limit of the maximum shrinkage stress is preferably 4.5 MPa and the upper limit thereof is preferably 10 MPa.

The maximum shrinkage stress refers to the maximum value of shrinkage stress measured when the heat shrinkable multilayer film is immersed in hot water at 80° C. for 30 seconds.

The maximum shrinkage stress can be adjusted by adjusting stretching conditions (e.g., stretching ratio, stretching temperature) or conditions such as the Vicat softening temperature of the polystyrene resin used in the interlayer.

Increasing the stretching temperature tends to decrease shrinkage stress, whereas decreasing the stretching temperature tends to increase shrinkage stress. The stretching temperature needs to be adjusted according to the Vicat softening temperature of the polystyrene resin used in the interlayer.

Decreasing the stretching ratio in the transverse direction (TD) decreases shrinkage stress, whereas increasing the stretching ratio increases shrinkage stress.

The lower limit of the dry heat shrinkage ratio of the heat shrinkable multilayer film of the present invention at 70° C. in 10 seconds is preferably 10%, and the upper limit thereof is preferably 30%. The heat shrinkable multilayer film having a dry heat shrinkage ratio of 10% or higher is less susceptible to wrinkles, print distortion, and uneven shrinkage when used as a heat shrinkable label for dry heat shrinking. The heat shrinkable multilayer film having a dry heat shrinkage ratio of 30% or lower can exhibit improved handleability. The lower limit of the dry heat shrinkage ratio is more preferably 12% and the upper limit thereof is more preferably 28%.

The lower limit of the dry heat shrinkage ratio at 70° C. in 10 seconds after the heat shrinkable multilayer film of the present invention is left to stand in an atmosphere at 30° C. for five days is preferably 8%, and the upper limit thereof is preferably 25%. The heat shrinkable multilayer film having a dry heat shrinkage ratio within the above range after standing in an atmosphere at 30° C. for five days is less susceptible to wrinkles, print distortion, and uneven shrinkage when used as a heat shrinkable label for dry heat shrinking after long-term storage. The lower limit of the dry heat shrinkage ratio after the heat shrinkable multilayer film is left to stand in an atmosphere at 30° C. for five days is more preferably 10%, and the upper limit thereof is more preferably 23%.

The lower limit of the dry heat shrinkage ratio of the heat shrinkable multilayer film of the present invention at 100° C.

in 10 seconds is preferably 65%, more preferably 70% and the upper limit thereof is preferably 85%, more preferably 80%.

The dry heat shrinkage ratio can be measured by the following method.

Figure 3:
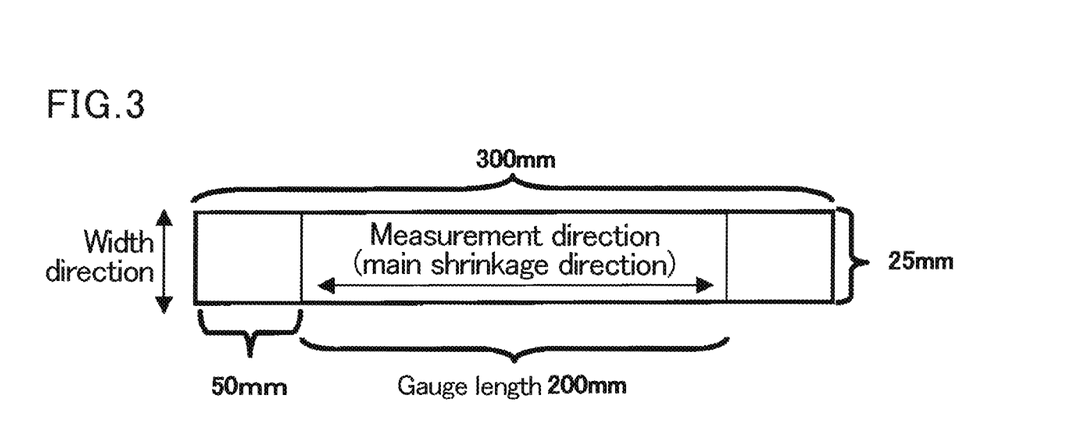
FIG. 3 is a schematic view of a measurement sample for dry heat shrinkage ratio measurement.
Figure 4:
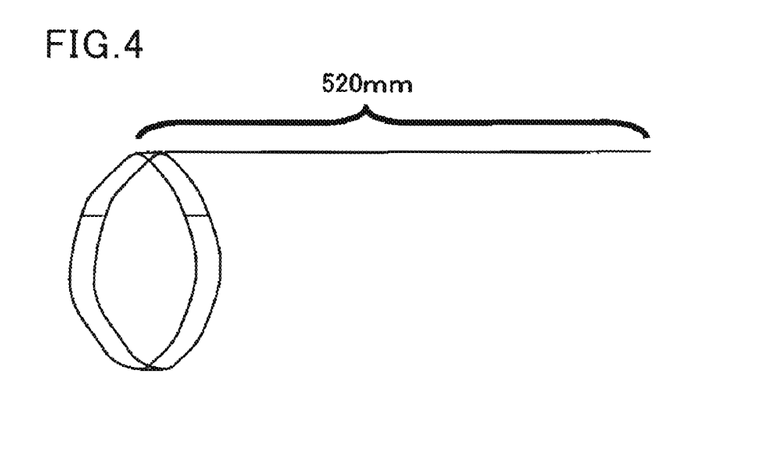
FIG. 4 is a schematic view showing a method for dry heat shrinkage ratio measurement.

The heat shrinkable multilayer film is cut to 300 mm×25 mm such that the TD (main shrinkage direction) corresponds to the long side. A gauge length of 200 mm is marked on the film, whereby a measurement sample is prepared (see FIG. 3). Both ends of the measurement sample are then fixed to a 520-mm-long pointer. The fixed heat shrinkable multilayer film is bent with the front layer on the outside (see FIG. 4). The measurement sample is then placed, from a side hole, into a constant-temperature and constant-humidity chamber (produced by Nagano Science Co., Ltd., LH31-12M) set at a predetermined temperature and humidity. After 10 seconds from placing, the heat shrinkable multilayer film is taken out and the gauge length is measured. The shrinkage ratio of the gauge length is calculated by the following formula.

Dry heat shrinkage ratio (%)={(200−gauge length after shrinking (mm))/200}×100

The average of the measurement results of three measurement samples is used as the dry heat shrinkage ratio. Values that are 2% or more away from the average are not counted.

The lower limit of the overall thickness of the heat shrinkable multilayer film of the present invention is preferably 20 μm and the upper limit thereof is preferably 80 μm. The heat shrinkable multilayer film having an overall thickness within the above range is economical and easy to handle.

In the heat shrinkable multilayer film of the present invention, the lower limit of the ratio of the thickness of the front and back layers to the thickness of the interlayer (thickness of the front and back layers/thickness of the interlayer) is preferably 1/12, more preferably 1/10, and the upper limit thereof is preferably 1/3, more preferably 1/4.

The "thickness of the front and back layers" herein means the thickness of each of the front layer and the back layer.

The lower limit of the proportion of the thickness of the front and back layers to the overall thickness of the heat shrinkable multilayer film of the present invention is preferably 7%, more preferably 8%, and the upper limit thereof is preferably 18%, more preferably 16%. When the proportion is 7% or more, the heat shrinkable multilayer film can exhibit sufficiently improved solvent resistance and heat resistance. When the proportion is 18% or less, the label is easily removable from a container.

For example, in the heat shrinkable multilayer film of the present invention with an overall thickness of 40 μm, the lower limit of the thickness of the front and back layers is preferably 2.8 μm, more preferably 3.2 μm and the upper limit thereof is preferably 7.2 μm, more preferably 6.4 μm.

The lower limit of the proportion of the thickness of the interlayer to the overall thickness of the heat shrinkable multilayer film of the present invention is preferably 60%, more preferably 65% and the upper limit thereof is preferably 84%, more preferably 82%. When the proportion is 65% or more, the label is easily removable from a container. When the proportion is 84% or less, the heat shrinkable multilayer film can exhibit sufficiently improved heat resistance.

For example, in the heat shrinkable multilayer film of the present invention with an overall thickness of 40 μm, the lower limit of the thickness of the interlayer is preferably 24 μm, more preferably 26 μm and the upper limit thereof is preferably 33.6 μm, more preferably 32.8 μm.

The lower limit of the proportion of the thickness of each adhesive layer to the overall thickness of the heat shrinkable multilayer film of the present invention is preferably 0.5%, more preferably 1% and the upper limit thereof is preferably 5%, more preferably 4%.

For example, in the heat shrinkable multilayer film of the present invention with an overall thickness of 40 μm, the lower limit of the thickness of each adhesive layer is preferably 0.2 μm, more preferably 0.4 μm and the upper limit thereof is preferably 2 μm, more preferably 1.6 μm.

The heat shrinkable multilayer film of the present invention may be produced by any method, and is preferably produced by simultaneously forming all the layers by a co-extrusion method. In T-die co-extrusion, for example, the layers may be stacked by a feed block technique, a multi-manifold technique, or a combination thereof.

Specifically, for example, the polyester resin to constitute the front and back layers, the polystyrene resin to constitute the interlayer, and the resin to constitute the adhesive layers are each fed into an extruder set at 160° C. to 250° C. and extruded into a sheet through a multilayer die set at 220° C. to 260° C., and cooled and solidified on a take-up roll set at 20° C. to 40° C., followed by uniaxial or biaxial stretching. The stretching temperature needs to be adjusted according to the softening temperatures of the resins constituting the film or the shrinkage properties required of the heat shrinkable multilayer film. The lower limit of the stretching temperature is preferably 70° C. and the upper limit thereof is preferably 120° C. The lower limit is more preferably 75° C. and the upper limit is more preferably 115° C. The lower limit of the temperature of the setting zone is preferably 80° C. and the upper limit thereof is preferably 120° C.

A heat shrinkable label can be obtained using the heat shrinkable multilayer film of the present invention as a base film. The heat shrinkable label is also encompassed by the present invention.

The heat shrinkable label of the present invention includes the heat shrinkable multilayer film of the present invention as a base film, and may contain any other layer such as an antistatic layer or a printed layer.

The heat shrinkable label of the present invention is usually attached to a container by bonding the ends of the heat shrinkable label of the present invention to each other using a solvent to form a tube (center sealing), then covering a container with the heat shrinkable label of the present invention, and shrinking the heat shrinkable label by heating.

Advantageous Effects of Invention

The present invention can provide a heat shrinkable multilayer film that can prevent layer misalignment at a center seal portion and thereby provide a labelled container having excellent appearance when the film is attached to a container as a heat shrinkable label for dry heat shrinking, and a heat shrinkable label including the heat shrinkable multilayer film as a base film.

DESCRIPTION OF EMBODIMENTS

The following will describe embodiments of the present invention in detail referring to examples, but the present invention should not be limited to these examples.

The following materials were used in examples and comparative examples.

(Polyester Resin)

Polyester resin A: polyester resin (glass transition temperature: 69° C.) containing 100 mol % of a component derived from terephthalic acid as a dicarboxylic acid component and containing 65 mol % of a component derived from ethylene glycol, 20 mol % of a component derived from diethylene glycol, and 15 mol % of a component derived from 1,4-cyclohexane dimethanol as diol components (Polystyrene Resin)

Polystyrene resin A: styrene-butadiene copolymer having a styrene content of 81.3% by weight and a butadiene content of 18.7% by weight (Vicat softening temperature: 81° C.)

Polystyrene resin B: styrene-butadiene copolymer having a styrene content of 77.7% by weight and a butadiene content of 22.3% by weight (Vicat softening temperature: 71° C.)

Polystyrene resin C: styrene-butadiene copolymer having a styrene content of 72% by weight and a butadiene content of 28% by weight (Vicat softening temperature: 76° C.)

(Polyester Elastomer)

Elastomer A: Hytrel 2521, produced by Du Pont-Toray Co., Ltd., durometer hardness 55

Example 1

Polyester resin A was used as a resin to constitute the front and back layers.

A mixed resin containing 30% by weight of elastomer A and 70% by weight of polystyrene resin C was used as a resin to constitute the adhesive layers.

A mixed resin containing 10% by weight of polystyrene resin A and 90% by weight of polystyrene resin B was used as a resin constituting the interlayer.

These resins were fed into extruders having a barrel temperature of 160° C. to 250° C., extruded into a three-layer sheet through a multilayer die at 250° C., and cooled and solidified on a take-up roll at 30° C. Subsequently, the sheet was roll-stretched in MD at stretching ratio of 1.5 times, then stretched in TD at a stretching ratio of 6 times in a tenter stretching machine with a preheating zone set at 112° C. (transit time: 5.3 seconds), a stretching zone set at 100° C. (transit time: 7.8 seconds), and a heat setting zone set at 102° C. (transit time: 5.3 seconds). The sheet was then wound with a winder, whereby a heat shrinkable multilayer film having a total thickness of 40 μm and a five-layer structure was obtained (front layer (5.7 μm)/adhesive layer (0.7 μm)/interlayer (27.2 μm)/adhesive layer (0.7 μm)/back layer (5.7 μm)).

Example 2

Polyester resin A was used as a resin to constitute the front and back layers.

A mixed resin containing 30% by weight of elastomer A and 70% by weight of polystyrene resin C was used as a resin to constitute the adhesive layers.

A mixed resin containing 15% by weight of polystyrene resin A and 85% by weight of polystyrene resin B was used as a resin to constitute the interlayer.

A heat shrinkable multilayer film was obtained as in Example 1 except that these resins were used.

The obtained heat shrinkable multilayer film had a total thickness of 40 μm and a five-layer structure (front layer (5.7 μm)/adhesive layer (0.7 μm)/interlayer (27.2 μm)/adhesive layer (0.7 μm)/back layer (5.7 μm)).

Example 3

Polyester resin A was used as a resin to constitute the front and back layers.

A mixed resin containing 30% by weight of elastomer A and 70% by weight of polystyrene resin C was used as a resin to constitute the adhesive layers.

A mixed resin containing 30% by weight of polystyrene resin A and 70% by weight of polystyrene resin B was used as a resin to constitute the interlayer.

A heat shrinkable multilayer film was obtained as in Example 1 except that these resins were used.

The obtained heat shrinkable multilayer film had a total thickness of 40 μm and a five-layer structure (front layer (5.7 μm)/adhesive layer (0.7 μm)/interlayer (27.2 μm)/adhesive layer (0.7 μm)/back layer (5.7 μm)).

Example 4

Polyester resin A was used as a resin to constitute the front and back layers.

A mixed resin containing 30% by weight of elastomer A and 70% by weight of polystyrene resin C was used as a resin to constitute the adhesive layers.

A mixed resin containing 45% by weight of polystyrene resin A and 55% by weight of polystyrene resin B was used as a resin to constitute the interlayer.

A heat shrinkable multilayer film was obtained as in Example 1 except that these resins were used.

The obtained heat shrinkable multilayer film had a total thickness of 40 μm and a five-layer structure (front layer (5.7 μm)/adhesive layer (0.7 μm)/interlayer (27.2 μm)/adhesive layer (0.7 μm)/back layer (5.7 μm)).

Example 5

Polyester resin A was used as a resin to constitute the front and back layers.

A mixed resin containing 30% by weight of elastomer A and 70% by weight of polystyrene resin C was used as a resin to constitute the adhesive layers.

A mixed resin containing 50% by weight of polystyrene resin A and 50% by weight of polystyrene resin B was used as a resin to constitute the interlayer.

A heat shrinkable multilayer film was obtained as in Example 1 except that these resins were used.

The obtained heat shrinkable multilayer film had a total thickness of 40 μm and a five-layer structure (front layer (5.7

μm)/adhesive layer (0.7 μm)/interlayer (27.2 μm)/adhesive layer (0.7 μm)/back layer (5.7 μm)).

Example 6

Polyester resin A was used as a resin to constitute the front and back layers.

A mixed resin containing 65% by weight of elastomer A and 35% by weight of polystyrene resin C was used as a resin to constitute the adhesive layers.

A mixed resin containing 10% by weight of polystyrene resin A and 90% by weight of polystyrene resins B was used as a resin to constitute the interlayer.

A heat shrinkable multilayer film was obtained as in Example 1 except that these resins were used.

The obtained heat shrinkable multilayer film had a total thickness of 50 μm and a five-layer structure (front layer (7 μm)/adhesive layer (1 μm)/interlayer (34 μm)/adhesive layer (1 μm)/back layer (7 μm)).

Example 7

Polyester resin A was used as a resin to constitute the front and back layers.

A mixed resin containing 65% by weight of elastomer A and 35% by weight of polystyrene resin C was used as a resin to constitute the adhesive layers.

A mixed resin containing 15% by weight of polystyrene resin A and 85% by weight of polystyrene resin B was used as a resin to constitute the interlayer.

A heat shrinkable multilayer film was obtained as in Example 1 except that these resins were used.

The obtained heat shrinkable multilayer film had a total thickness of 50 μm and a five-layer structure (front layer (7 μm)/adhesive layer (1 μm)/interlayer (34 μm)/adhesive layer (1 μm)/back layer (7 μm)).

Example 8

Polyester resin A was used as a resin to constitute the front and back layers.

A mixed resin containing 65% by weight of elastomer A and 35% by weight of polystyrene resin C was used as a resin to constitute the adhesive layers.

A mixed resin containing 30% by weight of polystyrene resin A and 70% by weight of polystyrene resin B was used as a resin to constitute the interlayer.

A heat shrinkable multilayer film was obtained as in Example 1 except that these resins were used.

The obtained heat shrinkable multilayer film had a total thickness of 50 μm and a five-layer structure (front layer (7 μm)/adhesive layer (1 μm)/interlayer (34 μm)/adhesive layer (1 μm)/back layer (7 μm)).

Example 9

Polyester resin A was used as a resin to constitute the front and back layers.

A mixed resin containing 65% by weight of elastomer A and 35% by weight of polystyrene resin C was used as a resin to constitute the adhesive layers.

A mixed resin containing 45% by weight of polystyrene resin A and 55% by weight of polystyrene resin B was used as a resin to constitute the interlayer.

A heat shrinkable multilayer film was obtained as in Example 1 except that these resins were used.

The obtained heat shrinkable multilayer film had a total thickness of 50 μm and a five-layer structure (front layer (7 μm)/adhesive layer (1 μm)/interlayer (34 μm)/adhesive layer (1 μm)/back layer (7 μm)).

Example 10

Polyester resin A was used as a resin to constitute the front and back layers.

A mixed resin containing 65% by weight of elastomer A and 35% by weight of polystyrene resin C was used as a resin to constitute the adhesive layers.

A mixed resin containing 50% by weight of polystyrene resin A and 50% by weight of polystyrene resin B was used as a resin to constitute the interlayer.

A heat shrinkable multilayer film was obtained as in Example 1 except that these resins were used.

The obtained heat shrinkable multilayer film had a total thickness of 50 μm and a five-layer structure (front layer (7 μm)/adhesive layer (1 μm)/interlayer (34 μm)/adhesive layer (1 μm)/back layer (7 μm)).

Comparative Example 1

Polyester resin A was used as a resin to constitute the front and back layers.

A mixed resin containing 30% by weight of elastomer A and 70% by weight of polystyrene resin C was used as a resin to constitute the adhesive layers.

A mixed resin containing 70% by weight of polystyrene resin A and 30% by weight of polystyrene resin B was used as a resin to constitute the interlayer.

A heat shrinkable multilayer film was obtained as in Example 1 except that these resins were used.

The obtained heat shrinkable multilayer film had a total thickness of 40 μm and a five-layer structure (front layer (5.7 μm)/adhesive layer (0.7 μm)/interlayer (27.2 μm)/adhesive layer (0.7 μm)/back layer (5.7 μm)).

Comparative Example 2

Polyester resin A was used as a resin to constitute the front and back layers.

A mixed resin containing 30% by weight of elastomer A and 70% by weight of polystyrene resin C was used as a resin to constitute the adhesive layers.

Polystyrene resin A was used as a resin to constitute the interlayer.

A heat shrinkable multilayer film was obtained as in Example 1 except that these resins were used.

The obtained heat shrinkable multilayer film had a total thickness of 40 μm and a five-layer structure (front layer (5.7 μm)/adhesive layer (0.7 μm)/interlayer (27.2 μm)/adhesive layer (0.7 μm)/back layer (5.7 μm)).

Comparative Example 3

Polyester resin A was used as a resin to constitute the front and back layers.

A mixed resin containing 30% by weight of elastomer A and 70% by weight of polystyrene resin C was used as a resin to constitute the adhesive layers.

Polystyrene resin B was used as a resin to constitute the interlayer.

A heat shrinkable multilayer film was obtained as in Example 1 except that these resins were used.

The obtained heat shrinkable multilayer film had a total thickness of 30 μm and a five-layer structure (front layer (3.2 μm)/adhesive layer (0.7 μm)/interlayer (22.2 μm)/adhesive layer (0.7 μm)/back layer (3.2 μm)).

(Evaluation)

The heat shrinkable multilayer films obtained in the examples and the comparative example were evaluated as follows. Table 1 shows the results.

(1) Shrinkage Stress

The obtained heat shrinkable multilayer film was cut to 200 mm×10 mm such that TD (main shrinkage direction) corresponded to the long side, whereby a measurement sample was obtained. One end of this measurement sample was fixed at a chuck distance of 100 mm, and the other end was connected to a load cell to measure the load (the output signals from the load cell were recorded by a recorder).

The measurement sample along with the chucks was immersed in hot water adjusted to 80° C. for 30 seconds. The shrinkage stress when the measurement sample was shrunk was measured. Here, the maximum value during 30 seconds was taken as the measurement value.

(2) Dry Heat Shrinkage Ratio

The heat shrinkable multilayer film was cut to 300 mm×25 mm such that the TD (main shrinkage direction) corresponded to the long side. A gauge length of 200 mm was marked on the film, whereby a measurement sample was prepared (see FIG. 3). Both ends of the measurement sample were then fixed to a 520-mm-long pointer. The fixed heat shrinkable multilayer film was bent with the front layer on the outside (see FIG. 4). The measurement sample was then placed, from a side hole, into a constant-temperature and constant-humidity chamber (produced by Nagano Science Co., Ltd., LH31-12M) set at a temperature of 70° C. or 100° C. and a humidity of 25%. After 10 seconds from placing, the heat shrinkable multilayer film was taken out and the gauge length was measured. The shrinkage ratio of the gauge length was calculated by the following formula.

Dry heat shrinkage ratio={(200−gauge length after shrinking (mm))/200}×100

The average of measurement results of three measurement samples was used as the dry heat shrinkage ratio. Values that were 2% or more away from the average were not counted.

(3) Layer Misalignment

The obtained heat shrinkable multilayer film was cut to 100 mm×200 mm such that TD (main shrinkage direction) corresponded to the long side. The film was solvent-sealed using a solvent mixture containing 100 parts by weight of 1,4-dioxolane and 40 parts by weight of cyclohexane such that the center seal portion was 5 mm wide and in parallel with MD (direction perpendicular to the main shrinkage direction). The film was then folded flat with the center seal portion positioned in the middle, whereby a tubular heat shrinkable label was obtained.

Thereafter, the heat shrinkable label was immersed in hot water at 100° C. for 30 seconds using a fixture capable of regulating the shrinkage ratio in TD, whereby the label was shrunk by 5% in TD.

The appearance of the center seal portion at this time was observed to examine misalignment between the interlayer and a front or back layer. The layer misalignment was evaluated according to the following criteria.

Good: The misalignment between the interlayer and a front or back layer at the center seal portion was smaller than 0.1 mm.

Poor: The misalignment between the interlayer and a front or back layer at the center seal portion was 0.1 mm or greater.

(4) Attachability

Labels having a lay flat width of 132 mm and a length of 110 mm were produced using the heat shrinkable multilayer films obtained in Examples 1 to 10 and Comparative Examples 1 to 3.

A covering type shrink tunnel K-1000 (produced by Kyowa Denki Co., Ltd.) was set at a tunnel temperature of 95° C., an air flow of 20 Hz, and a belt speed of 25 Hz (transit time: 25 seconds) and used as tunnel 1.

Separately, a covering type shrink tunnel K-100 (produced by Kyowa Denki Co., Ltd.) was set at a tunnel temperature of 100° C., an air flow of 40 Hz, a belt speed of 25 Hz (transit time: 25 seconds) and used as tunnel 2.

Subsequently, each obtained label was attached to a spray bottle (Kabi Killer® spray bottle, capacity: 400 mL, width: 102 mm, depth: 57 mm, height: 164 mm), and passed through tunnel 1, then a room temperature atmosphere for 7 seconds, and then tunnel 2. The label was thus shrunk and attached to the container.

The label attachability (attachment finish) was evaluated as follows.

Good: No appearance defect due to insufficient shrinking or the like was observed.

Poor: An appearance defect due to insufficient shrinking or the like was observed at the upper end of the label or any other portion.

TABLE 1

|  |  |  | Example |  |  |  |  |  |  |  |  |  | Comparative Example |  |  |
|---|---|---|---|---|---|---|---|---|---|---|---|---|---|---|---|
|  |  |  | 1 | 2 | 3 | 4 | 5 | 6 | 7 | 8 | 9 | 10 | 1 | 2 | 3 |
| Heat shrinkable multilayer film | Front and back layers | Polyester resin A (% by weight) | 100 | 100 | 100 | 100 | 100 | 100 | 100 | 100 | 100 | 100 | 100 | 100 | 100 |
|  |  | Thickness (μm) | 5.7 | 5.7 | 5.7 | 5.7 | 5.7 | 7 | 7 | 7 | 7 | 7 | 5.7 | 5.7 | 3.2 |
|  | Adhesive layer | Elastomer A (% by weight) | 30 | 30 | 30 | 30 | 30 | 65 | 65 | 65 | 65 | 65 | 30 | 30 | 30 |
|  |  | Polystyrene resin C (% by weight) | 70 | 70 | 70 | 70 | 70 | 35 | 35 | 35 | 35 | 35 | 70 | 70 | 70 |
|  |  | Thickness (μm) | 0.7 | 0.7 | 0.7 | 0.7 | 0.7 | 1 | 1 | 1 | 1 | 1 | 0.7 | 0.7 | 0.7 |
|  | Interlayer | Polystyrene resin A (% by weight) | 10 | 15 | 30 | 45 | 50 | 10 | 15 | 30 | 45 | 50 | 70 | 100 | — |
|  |  | Polystyrene resin B (% by weight) | 90 | 85 | 70 | 55 | 50 | 90 | 85 | 70 | 55 | 50 | 30 | — | 100 |
|  |  | Thickness (μm) | 27.2 | 27.2 | 27.2 | 27.2 | 27.2 | 34 | 34 | 34 | 34 | 34 | 27.2 | 27.2 | 22.2 |
|  | Total thickness (μm) |  | 40 | 40 | 40 | 40 | 40 | 50 | 50 | 50 | 50 | 50 | 40 | 40 | 30 |

TABLE 1-continued

|  |  | Example | | | | | | | | | | Comparative Example | | |
| --- | --- | --- | --- | --- | --- | --- | --- | --- | --- | --- | --- | --- | --- | --- |
|  |  | 1 | 2 | 3 | 4 | 5 | 6 | 7 | 8 | 9 | 10 | 1 | 2 | 3 |
| Evaluation | Shrinkage stress (MPa) | 6.5 | 8.3 | 8.8 | 9.5 | 10 | 5.4 | 6.8 | 7.2 | 7.6 | 8 | 12 | 12.5 | 3 |
|  | Dry heat shrinkage ratio (%) 70° C. | 20 | 21 | 20 | 20 | 20 | 20 | 20 | 20 | 20 | 20 | 19 | 19 | 16 |
|  | 100° C. | 77 | 77 | 76 | 75 | 75 | 76 | 75 | 74 | 73 | 74 | 72 | 72 | 68 |
|  | Layer misalignment | Good | Good | Good | Good | Good | Good | Good | Good | Good | Good | Poor | Poor | Good |
|  | Attatchability | Good | Good | Good | Good | Good | Good | Good | Good | Good | Good | Good | Good | Poor |

INDUSTRIAL APPLICABILITY

The present invention can provide a heat shrinkable multilayer film that can prevent layer misalignment at a center seal portion and thereby provide a labelled container having excellent appearance when the film is attached to a container as a heat shrinkable label for dry heat shrinking, and a heat shrinkable label including the heat shrinkable multilayer film as a base film.

REFERENCE SIGNS LIST 1 front or back layer
2 adhesive layer
3 interlayer
4 adhesive layer
5 front or back layer
6 front or back layer
7 adhesive layer
8 interlayer
9 adhesive layer
10 front or back layer
11 container

The invention claimed is:

1. A heat shrinkable multilayer film comprising:
   front and back layers each containing a polyester resin;
   an interlayer containing a polystyrene resin; and
   adhesive layers each containing a styrene-butadiene copolymer, which is a copolymer consisting of a component derived from styrene as an aromatic vinyl hydrocarbon and a component derived from 1,3-butadiene as a conjugated diene,
   wherein the front and back layers and the interlayer are stacked with the adhesive layers interposed therebetween,
   the heat shrinkable multilayer film has a maximum shrinkage stress of 3.5 to 11 MPa, which is measured by immersing in hot water at 80° C. for 30 seconds,
   the polystyrene resin constituting the interlayer is a mixed resin containing a styrene-butadiene copolymer (A) having a Vicat softening temperature of 80° C. or higher and a styrene-butadiene copolymer (B) having a Vicat softening temperature of lower than 80° C.,
   the interlayer contains 1 to 35% by weight of the styrene-butadiene copolymer (A) and 65 to 99% by weight of the styrene-butadiene copolymer (B),
   wherein the styrene-butadiene copolymer (A) and the styrene-butadiene copolymer (B) in the interlayer represents all of the polystyrene resin in the interlayer, and
   the styrene-butadiene copolymer constituting the adhesive layers has a higher butadiene content than all of the styrene-butadiene copolymers constituting the interlayer.

2. The heat shrinkable multilayer film according to claim 1,
   wherein the polyester resin constituting the front and back layers has a glass transition temperature of 55° C. to 95° C.

3. The heat shrinkable multilayer film according to claim 1,
   wherein the adhesive layer contains the styrene-butadiene copolymer in an amount of 35 to 70% by weight and a polyester elastomer in an amount of 30 to 65% by weight.

4. A heat shrinkable label comprising
   the heat shrinkable multilayer film according to claim 1.

* * * * *